Feb. 21, 1928.
S. HANSON
DISPENSING MACHINE
Filed Feb. 1, 1926    2 Sheets-Sheet 1
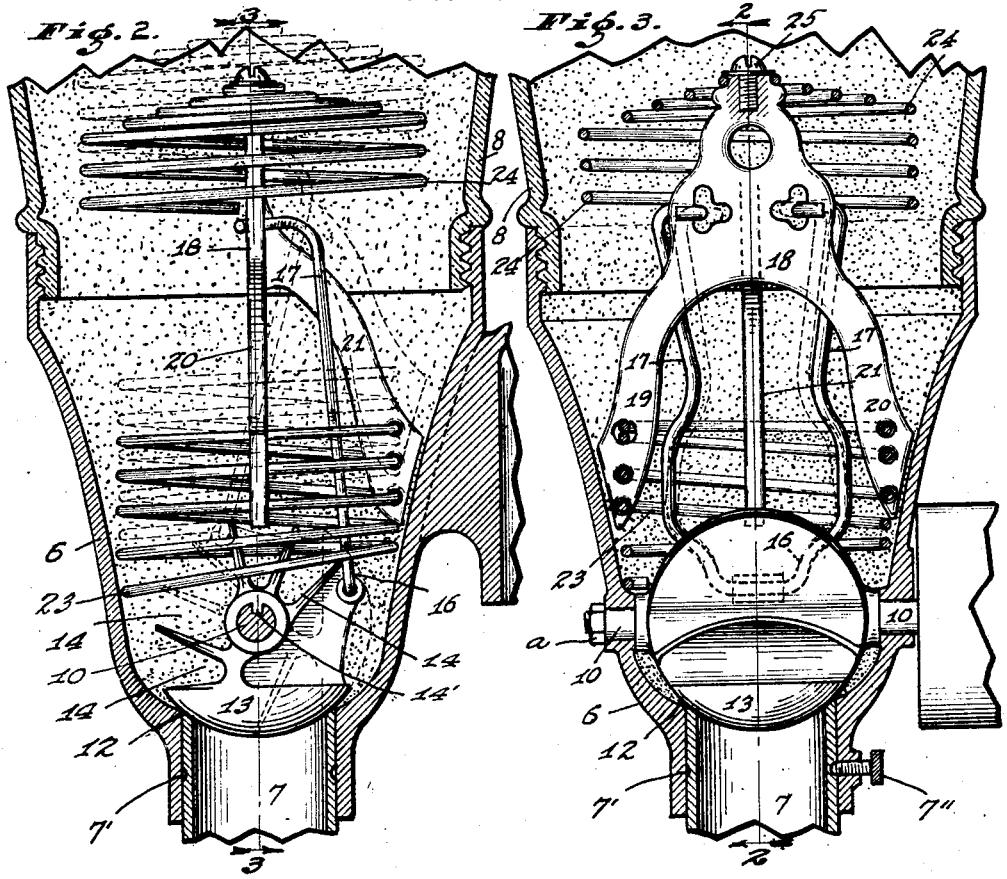
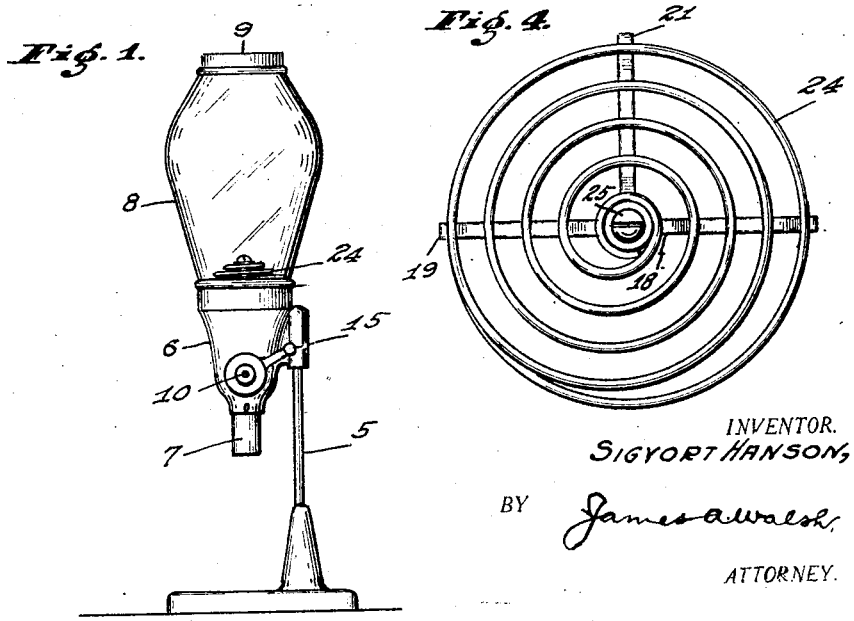
INVENTOR.
SIGVORT HANSON,
BY James A. Walsh
ATTORNEY.

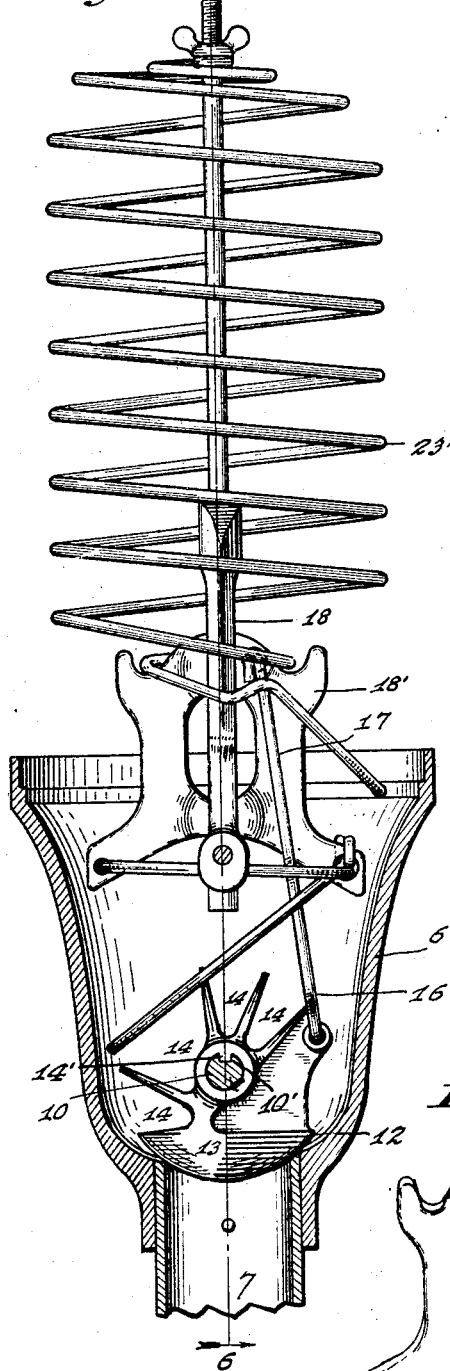
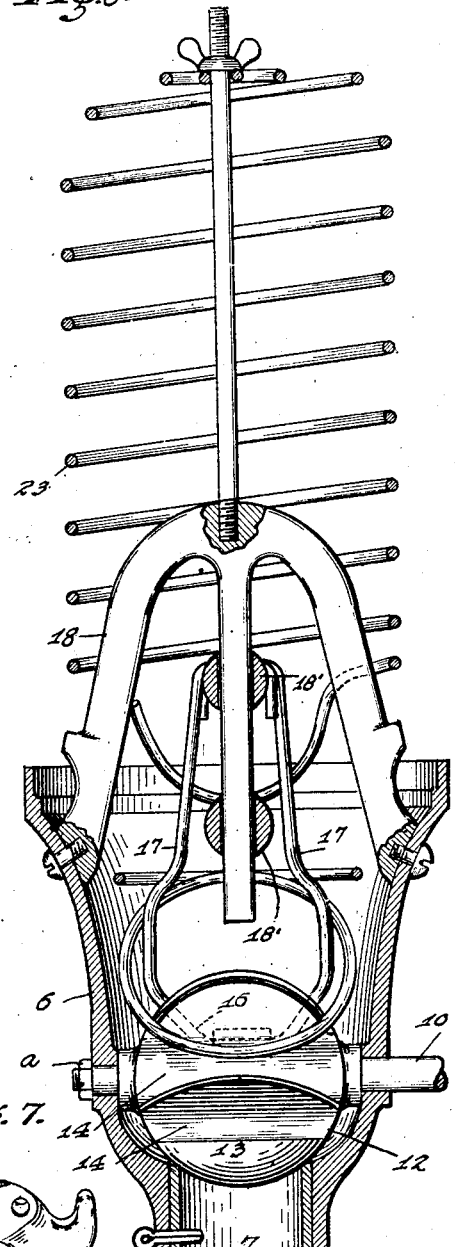
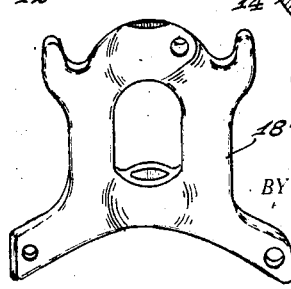

Patented Feb. 21, 1928.

1,659,772

UNITED STATES PATENT OFFICE.

SIGVORT HANSON, OF RACINE, WISCONSIN, ASSIGNOR, BY MESNE ASSIGNMENTS, TO RACINE DISPENSER MANUFACTURING COMPANY, OF RACINE, WISCONSIN, A CORPORATION.

DISPENSING MACHINE.

Application filed February 1, 1926. Serial No. 85,204.

My present invention relates to improvements in machines for dispensing material, particularly of the character of malted milk and the like of a sticky and adhesive nature affected by atmospheric conditions, whereby I am enabled to efficiently agitate the powdered milk mass when desired, or upon the dispensation of each charge delivered from the machine, so that the supply of such material in the dispenser is maintained in substantially dry condition and frequently agitated and separated and prevented from hardening or concretion under the conditions stated, such a type of dispensing machine being fully disclosed in my Patent No. 1,633,207, issued June 21, 1927.

In the accompanying drawing, forming part hereof, Figure 1 is an elevation of a dispensing machine to which my improvement relates; Fig. 2 a detail vertical section taken on the dotted line 2—2 in Fig. 3; Fig. 3 a detail vertical section on the dotted line 3—3 in Fig. 2; Fig. 4 a plan of the upper portion of the agitator which I employ; and Figs. 5, 6 and 7 are elevations of parts of a modified form of such improvement, Fig. 6 taken on the dotted line 6—6 in Fig. 5, and Fig. 7 being a detail elevation of a portion of the frame structure which I may employ.

In said drawings the portions marked 5 indicate a stand upon which my improved dispenser is adjustably mounted, said dispenser comprising a bowl, 6, having a removable discharge outlet, 7, and a material container, 8, having a closure, 9, at its upper end, into which container the supply of material to be dispensed is deposited said outlet 7 being provided with a circumferential groove 7' for ready attachment to bowl 6 by a set-screw 7" or the like.

In said bowl 6 I mount a rock-shaft, 10, which carries a discharger, 12 (Fig. 3), comprising a closure, 13, and a plurality of compartments, 14 (Fig. 2), of varying capacities, said discharger being actuated rotatably or rocked by shaft 10 through the operation of lever, 15, and mechanisms associated therewith, all of which parts are of substantially the character and operate in a similar manner as the like parts disclosed in my said patent. However, said shaft embodies a groove 10' so that when inserted through the bearing of discharger 12 a ridge 14' thereof will engage said shaft to prevent the latter from turning therein, said shaft being held in position by a nut a or other removable device so that it may be readily disconnected from discharger 12.

To said discharger 12 I pivotally connect a carrier, 16, preferably of spring wire having supporting arms, 17, which are engaged in and support a frame, 18, having legs 19, 20, 21, through which I lace or otherwise secure a coiled spring, 23, said spring occupying a position within bowl 6, as indicated. Upon the upper end of said frame 18 I provide a coiled spring, 24, secured thereto by a screw, 25, or otherwise, and the several windings of which spring are preferably confined within the material container 8.

In the modified form shown in Figs. 5, 6 and 7 the frame 18 is shown as fixed to the bowl 6, while coiled spring 23, connected to holder or supplemental frame 18' supported upon carrier 16, is actuated by discharger 12, in substantially the same manner as accomplished by my preferred form, as will appear.

In operation, it will be understood that bowl 6 and container 8 are supplied with material, and when it is desired to dispense a portion thereof, as for a malted milk drink, lever 15 is pulled forwardly, which rotates or rocks shaft 10 and with it the discharger 12, so that closure 13 of the latter will travel away from and open outlet 7 to permit the material in a compartment 14 to be discharged into the outlet, the discharger being adjustable so that any one of the several compartments selected will register with said outlet and convey its charge of material thereinto. When discharger 12 is thus rotating spring 23 is caused to move upwardly and downwardly in the bowl, as indicated by the dotted lines in Fig. 2, which spring at the same time through its connection with frame 18 causes the latter to move accordingly, said frame carrying with it the coiled spring 24 to the position shown by the dotted lines in Fig. 2. The assemblage of mechanisms thus described constitutes an agitator which loosens and disintegrates the material in the dispenser as the springs 23, 24, frame 18, and discharger 12, travel therethrough and, when lever 15 has been released, shaft 10 and discharger 12, with the agitating elements described, instantly return to the position indicated in Fig. 2, which return movement is of a somewhat sudden and violent character, causing said springs when returning through the mass of material to vibrate appreciably, so that there is an irregular shattering, jarring and separation of such material, and by which means I am enabled to frequently disturb and agitate the same to prevent a cohesive condition arising therein under the changes in atmospheric temperature, which occurs where such material is not subjected to a stirring or agitating action, and all of which I accomplish without the employment of extraneous devices, thus assuring a highly sanitary dispensation of the material. In the modified form shown it will be understood that spring 23 has imparted thereto an up and down motion through the manipulation of the discharger, and that I attain similar results as explained in describing the operation of my said preferred form. In the manner stated, it will be understood that the material in the dispensing machine may be at all times disturbed and agitated so that the cohesion of its particles will be prevented and free and unobstructed or retarded flow thereof into and through the machine outlet in loose powdered form is assured.

I claim as my invention:

1. In a dispenser, a material receiving chamber, a discharger therein, a rock-shaft supporting said discharger, a frame, a spring supported thereby, pivotal means connecting said discharger to and supporting said frame, and means for rocking said shaft and actuating said discharger to agitate said spring for separating material in said chamber.

2. In a dispenser, a material receiving chamber, yielding means for agitating and separating material therein, a frame upon which said yielding means are mounted, a carrier having arms connected to and supporting said frame, a discharger pivotally connected to said carrier, and means for rocking said discharger which in turn actuates said carrier and said yielding means to agitate and separate material in said chamber.

In testimony whereof I affix my signature.

SIGVORT HANSON.